(12) United States Patent
Chen

(10) Patent No.: US 7,893,565 B2
(45) Date of Patent: Feb. 22, 2011

(54) POWER SAVING HAND-HELD ELECTRONIC DEVICE

(75) Inventor: Peihsien Chen, Hsinchu County (TW)

(73) Assignee: GTA Electronics Co., Ltd., Taipei County (TW)

( * ) Notice: Subject to any disclaimer, the term of this patent is extended or adjusted under 35 U.S.C. 154(b) by 98 days.

(21) Appl. No.: 12/408,311

(22) Filed: Mar. 20, 2009

(65) Prior Publication Data

US 2010/0237712 A1    Sep. 23, 2010

(51) Int. Cl.
*H01H 35/00* (2006.01)
(52) U.S. Cl. ............................................ 307/117
(58) Field of Classification Search ............... 307/117
See application file for complete search history.

(56) References Cited

U.S. PATENT DOCUMENTS

| | | | | |
|---|---|---|---|---|
| 5,832,237 | A * | 11/1998 | Lee ............................ | 710/303 |
| 6,726,106 | B1 * | 4/2004 | Han et al. ............... | 235/472.01 |
| 7,110,062 | B1 * | 9/2006 | Whitted et al. ................ | 349/68 |
| 7,236,154 | B1 * | 6/2007 | Kerr et al. .................... | 345/102 |
| 7,425,899 | B2 * | 9/2008 | Stewart et al. ........... | 340/572.4 |
| 2006/0092182 | A1 * | 5/2006 | Diefenbaugh et al. ....... | 345/690 |
| 2007/0195074 | A1 * | 8/2007 | Gelissen ..................... | 345/204 |
| 2008/0217410 | A1 * | 9/2008 | Blake et al. .............. | 235/462.3 |

* cited by examiner

*Primary Examiner*—Jared J Fureman
*Assistant Examiner*—Adi Amrany
(74) *Attorney, Agent, or Firm*—Muncy, Geissler, Olds & Lowe, PLLC

(57) ABSTRACT

A power-saving hand-held electronic device has a front side and a back side wherein each of the front side and the back side is provided with one light sensor, respectively, for controllably switching the hand-held electronic device between an operating mode and a power-saving mode. When the light sensor on the back side is blocked and the light sensor on the front side is triggered, the electronic device will be ushered into the operating mode or into the power-saving mode otherwise. The electronic device can determine whether the device should enter the power-saving mode, and it can effective control an automatic locking function with a view to achieving the synergistic effect of power saving and convenience.

9 Claims, 3 Drawing Sheets

POWER SAVING HAND-HELD ELECTRONIC DEVICE

BACKGROUND OF THE INVENTION

1. Field of the Invention

The present invention relates to the improved structure of a hand-held electronic devices, and more particularly, to a power-saving hand-held electronic device.

2. Description of the Prior Art

Owing to the advancement of semiconductor process technology, various electronic chips and modules are downsized, and thus hand-held electronic devices nowadays, such as mobile communication devices, personal digital assistants (PDA), and global positioning system (GPS) devices, are becoming more multifunctional and more capable of integrating their functions with each other. For instance, in addition to intrinsic phoning function, mobile communication devices nowadays come in different integrated functions, namely taking pictures, radio reception, playing MP3, playing movie, personal digital assistants (PDA), TV program broadcasting, and even global positioning system (GPS).

However, the devices having multiple functions usually have some drawback, that is, high power consumption. In general, the power source of the hand-held electronic devices is the built-in lithium batteries, and thus battery life depends on battery capacity. Most of the existing hand-held electronic devices are equipped with color screens that function as display devices, which are consumed power faster than monochrome hand-held electronic devices. Hence, in this regard, multiple functions of devices are unfavorable for battery life, especially lengthy movie playing. For instance, it is possible to watch approximately for one hour TV program broadcast in a wireless device, using a hand-held electronic device with a full battery, but the one-hour TV watching session is normally too short to satisfy audiences who crave for information and entertainment.

Accordingly, the present invention is intended to disclose extending a service session of hand-held electronic devices without boosting the battery capacity thereof.

SUMMARY OF THE INVENTION

It is a primary objective of the present invention to provide a power-saving hand-held electronic device characterized by turning on and turning off a power-saving mode according to a user's operation preference and thereby switching between an operating mode and the power-saving mode automatically so as to save power and prolong service life of the hand-held electronic device.

To achieve the above objectives, the present invention provides a hand-held electronic device having a front side and a back side and characterized in that: the front side and the back side are provided with a first light sensor and a second light sensor, respectively, so as to control switching of the hand-held electronic device between an operating mode and a power-saving mode.

Another objective of the present invention is to provide a hand-held electronic device with an automatic locking function effectuated by light sensors of the hand-held electronic device with a view to saving power, preventing an inadvertent touch by the user, and enhancing ease of use of the hand-held electronic device.

To achieve the above and other objectives, the present invention provides a power-saving hand-held electronic device further comprising the front side provided with a touch pad, in such that when the first light sensor is triggered and the second light sensor is blocked, the power-saving hand-held electronic device will enter into a touch input mode, or in a touch lock mode otherwise.

To achieve the above objectives, the present invention provides a power-saving hand-held electronic device further comprising the front side provided with a key module, when the first light sensor is triggered and the second light sensor is blocked, the device will enter into a key input mode or in a key lock mode otherwise.

In a preferred embodiment of the present invention, the front side of the hand-held electronic device is provided with at least one of a monitor, a touch pad, or a key module.

To use the power-saving hand-held electronic device of the present invention, a user holds the device by the back side manually such that the front side faces the user. In so doing, the light sensor on the back side is hidden by hand and therefore is incapable of detecting light, but the front side is exposed and therefore is capable of detecting light. Accordingly, as disclosed in the present invention, the device of the present invention can determine whether the device should enter the power-saving mode, and it can effective control an automatic locking function with a view to achieving the synergistic effect of power saving and convenience.

DETAILED DESCRIPTION OF THE EMBODIMENTS

To enable full understanding of the objectives, features, and effects of the present invention, the present invention is illustrated with specific preferred embodiments and drawings and is described in detail as follows.

Figure 1:
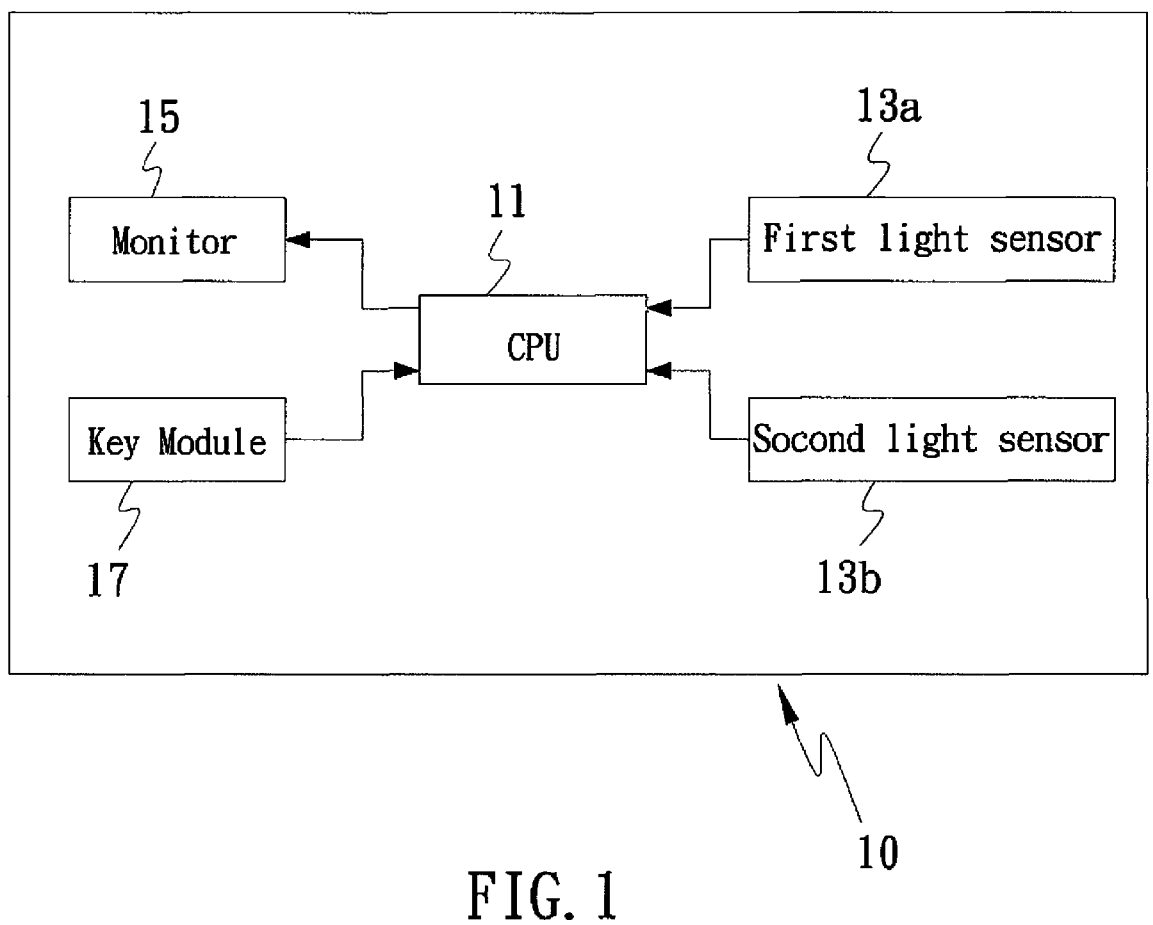
FIG. 1 is a functional block diagram of a power-saving hand-held electronic device in a preferred embodiment of the present invention.

Referring to FIG. 1, which is a functional block diagram of a power-saving hand-held electronic device in a preferred embodiment of the present invention, the present invention discloses a power-saving hand-held electronic device 10, comprising: a CPU (central processing unit) 11, a first light sensor 13a provided on the front side of the hand-held electronic device 10, a second light sensor 13b provided on the back side of the hand-held electronic device 10, a monitor 15, and a key module 17.

The hand-held electronic device 10 is a mobile communication device, a personal digital assistant (PDA), a global positioning system (GPS) device, etc. A light sensor comprises a light-emitting element (not shown) and a light-receiving element (not shown). Light from the light-emitting element is focused through a lens and is then transmitted to another lens of the light-receiving element before reaching a receipt sensor. The receipt sensor converts a received light signal into an electronic signal. In a preferred embodiment of the present invention, electronic signals are defined with different switches and control operations. The underlying principle of the present invention is that various automation controls of the present invention are implemented and effectuated, the signals acquired by blocking light transmitted between the light-emitting element and the light-receiving element are utilized to achieve the objectives of the present invention.

The hand-held electronic device 10 enters into an operating mode as soon as the power of the hand-held electronic device 10 is on; meanwhile, the first light sensor 13a on the front side and the second light sensor 13b on the back side are initiated by the power. When the first light sensor 13a (i.e., sensing brightness of the front side) is triggered and the second light sensor 13b (i.e., sensing darkness of the back side) is blocked, the hand-held electronic device 10 will then be ushered into the operating mode or maintained the operating mode. In the situation where the first light sensor 13a is blocked and the second light sensor 13b is triggered or blocked, or where both the first light sensor 13a and the second light sensor 13b are triggered, and when the CPU 11 has not received an instruction to enter the operating mode for a specific period of time (such as: 3 to 5 seconds), the hand-held electronic device 10 will then automatically enter a power-saving mode whereby the monitor 15 and a portion of key functions are shut down in order to reduce power consumption. If the CPU 11 receives signal before the deadline of the specific time period, the hand-held electronic device 10 will follow the instruction to enter the operating mode, then the operating mode will continue, and the specific time period will only start to run from the moment when an ensuing instruction to enter the power-saving mode is received.

Figures 2, 3:
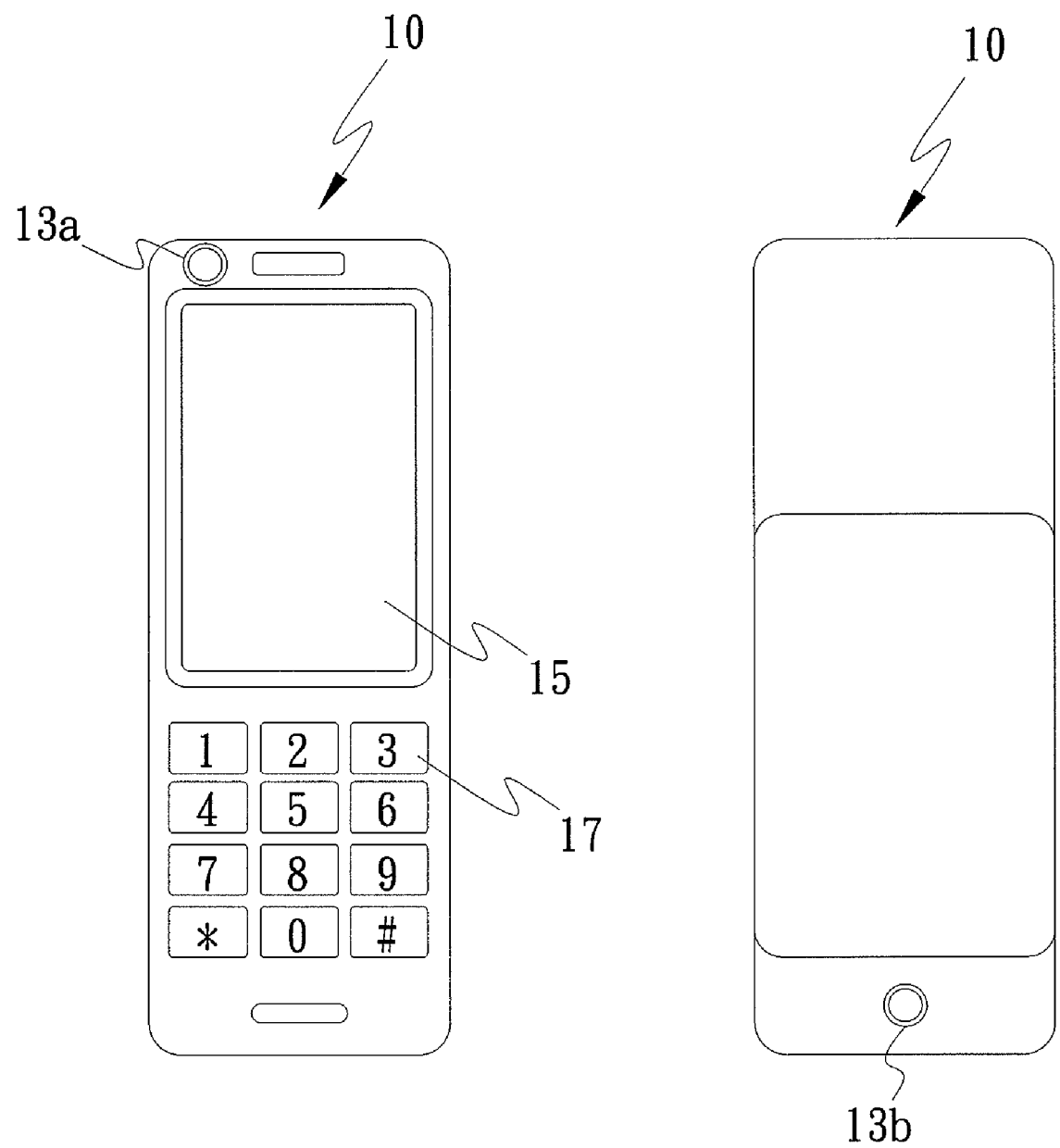
FIG. 2 is a schematic view of the front side of the hand-held electronic device in the preferred embodiment of the present invention.
FIG. 3 is a schematic view of the back side of the hand-held electronic device in the preferred embodiment of the present invention.

Referring to FIG. 2 and FIG. 3, which are schematic views of the front side and the back side of the hand-held electronic device in the preferred embodiment of the present invention, respectively, the front side of the hand-held electronic device 10 is provided with the first light sensor 13a, the monitor 15 and the key module 17, and the back side of the hand-held electronic device 10 is provided with the second light sensor 13b. The preferred embodiment merely serves an illustrative purpose, and thus the hand-held electronic device 10 can be a touch electronic device without the key module 17 but with a touch pad which can substitute for the monitor 15 and the key module 17.

In another preferred embodiment of the present invention, the light sensors 13a, 13b together provide a control mechanism for an automatic locking function of the hand-held electronic device 10. As describe earlier, when the first light sensor 13a (i.e., sensing brightness of the front side) is triggered and the second light sensor 13b (i.e., sensing darkness of the back side) is blocked, the hand-held electronic device 10 will be ushered into an input mode to allow a user to enter data into the hand-held electronic device 10 by means of the touch pad or the key module 17. When the first light sensor 13a is blocked and the second light sensor 13b is either triggered or blocked, or, alternatively, when the first light sensor 13a is triggered and the second light sensor 13b is also triggered, the hand-held electronic device 10 will be ushered into a lock mode, in which the user is prevented from giving the hand-held electronic device 10 an inadvertent touch which might otherwise add to power consumption.

As disclosed in the present invention, to use specific functions of the hand-held electronic device 10, such as playing music or playing a movie, the CPU 11 will turn off the light sensor-enabled power saving function except the light sensor-enabled automatic locking function still will be on so as to facilitate the specific playing functions. Alternatively, the aforesaid configuration can be modified to turn off the automatic locking function as well. Or, a user can configure the operational relationship between the power saving function and the automatic locking function in a way different from the aforesaid disclosure, by using the CPU 11.

Figure 4:
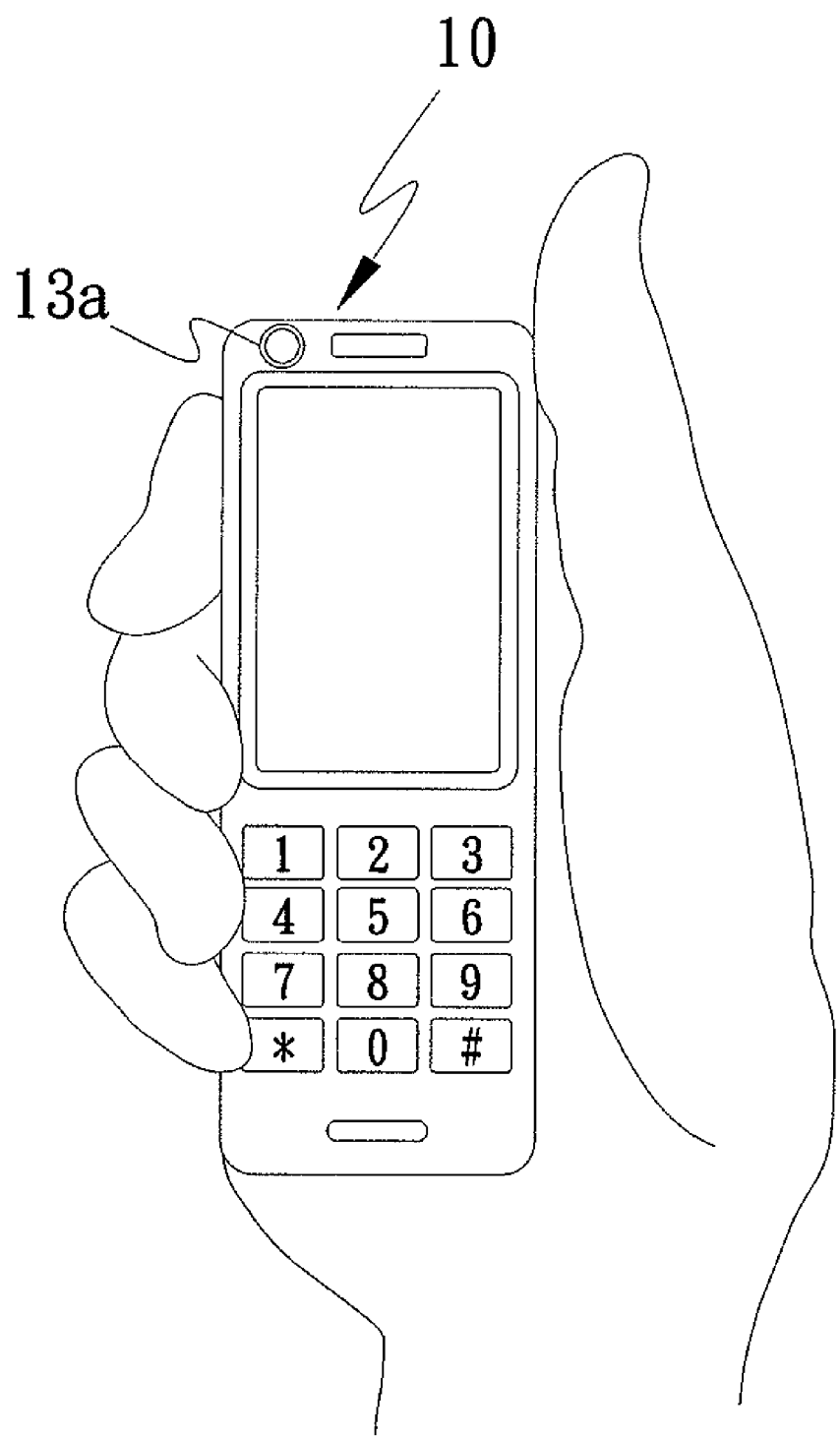
FIG. 4 is a schematic view of the application of the hand-held electronic device in a preferred embodiment of the present invention.

Referring to FIG. 4, which is a schematic view of the application of the hand-held electronic device in a preferred embodiment of the present invention, normally, a user is holding the hand-held electronic device 10 of the present invention by hand with an intention to use it. In the meanwhile, the first light sensor 13a on the front side of the hand-held electronic device 10 is exposed and thereby it is triggered, but the second light sensor 13b (not shown) located on the back side of the hand-held electronic device 10, which is hidden and thereby is blocked. Hence, the hand-held electronic device 10 of the present invention is designed in such that not only it can enter into the operating mode, but it also can enter into the input mode which allows the hand-held electronic device remained unlocked in order to allow the user to operate the hand-held electronic device 10.

On the other hand, if the user puts the hand-held electronic device 10 in a pocket or in a bag, both the first and second light sensors 13a, 13b will be blocked and therefore the device will be automatically entered into the power-saving mode and the lock mode. Hence, the user can use the hand-held electronic device 10 conveniently without worrying whether the hand-held electronic device is in lock mode or not because the user does not require to press a lock key in order to lock the device, not to mention that the hand-held electronic device 10 can enter into a power-saving state automatically without specific input from the user so as to extend a service session.

The front side of the hand-held electronic device 10 of the present invention is provided with at least one of a monitor, a touch pad, or a key module. In this regard, a typical example is a combination of the monitor and the key module, and another typical example is the touch pad operating in a standalone manner.

In the latter scenario where the front side is provided with the touch pad, and when the first light sensor 13a is triggered and the second light sensor 13b is blocked, then the device will be ushered into a touch input mode, or in a touch lock mode otherwise.

In the former scenario where the front side is provided with the key module, and when the first light sensor 13a is triggered and the second light sensor 13b is blocked, the device will be ushered into a key input mode, or in a key lock mode otherwise.

In short, the present invention discloses implementing automatic switching by light sensors so as to effectuate a power saving function and an automatic locking function, and in consequence not only is the power supplied to the hand-held electronic device efficiently monitored, controlled, and managed, but the mechanism for automatic switching enhances ease of use.

The invention has been disclosed with the preferred embodiments in the above description. However, it should be apparent to those skilled in the art that the preferred embodiments are only illustrative of the features and functions of the present invention, and are not intended to restrict the scope of the present invention. It should be noticed that all equivalent changes and modifications made in the preferred embodiments of the present invention should fall within the scope of the present invention without departing from the disclosure therein. Accordingly, the scope of the claims of the present invention should be defined by the claims hereunder.

What is claimed is:

1. A power-saving hand-held electronic device comprising a front side and a back side, the front side and the back side being provided with a first light sensor and a second light sensor, respectively, for controllably switching the hand-held device between an operating mode and a power-saving mode, wherein when the first light sensor is triggered and the second light sensor is blocked, the power-saving hand-held electronic device will be ushered into the operating mode, or into the power-saving mode otherwise.

2. The power-saving hand-held electronic device of claim 1, wherein when the first and second light sensors are both triggered, the power-saving hand-held electronic device will be ushered into the power-saving mode.

3. The power-saving hand-held electronic device of claim 1, wherein when the first and second light sensors are both blocked, the power-saving hand-held electronic device will be ushered into the power-saving mode.

4. The power-saving hand-held electronic device of claim 1, wherein when the first light sensor is blocked and the second light sensor is triggered, the power-saving hand-held electronic device will be ushered into the power-saving mode.

5. The power-saving hand-held electronic device of claim 1, wherein the front side is provided with at least one of a monitor, a touch pad, or a key module.

6. The power-saving hand-held electronic device of claim 1, wherein the front side is provided with a touch pad, and when the first light sensor is triggered and the second light sensor is blocked, the power-saving hand-held electronic device will be ushered in a touch input mode, or into a touch lock mode otherwise.

7. The power-saving hand-held electronic device of claim 1, wherein the front side is provided with a key module, and when the first light sensor is triggered and the second light sensor is blocked, the power-saving hand-held electronic device will be ushered into a key input mode, or into a key lock mode otherwise.

8. The power-saving hand-held electronic device of claim 1, wherein entry into the power-saving mode takes place for a specific period of time after exit from the operating mode.

9. The power-saving hand-held electronic device of claim 1, wherein the front side is provided with at least one of a monitor, a touch pad, or a key module.

* * * * *